United States Patent [19]

Murakami et al.

[11] Patent Number: 4,680,757
[45] Date of Patent: Jul. 14, 1987

[54] METHOD OF AND APPARATUS FOR STORING PRIORITY LEVELS IN TOKEN-RING NETWORK SYSTEM

[75] Inventors: Toshiyuki Murakami, Hitachi; Norihiko Sugimoto, Katsuta; Naoki Ogawa, Omura, all of Japan

[73] Assignees: Hitachi, Ltd.; Process Computer Engineering, Inc. Hitachi, both of Tokyo, Japan

[21] Appl. No.: 852,311

[22] Filed: Apr. 15, 1986

[30] Foreign Application Priority Data

Apr. 15, 1985 [JP] Japan ................................. 60-78291

[51] Int. Cl.⁴ .............................................. H04J 3/26
[52] U.S. Cl. .................................. 370/89; 340/825.5; 340/825.05
[58] Field of Search ...................... 370/89, 90, 86, 85; 340/825.5, 825.51, 825.05

[56] References Cited

U.S. PATENT DOCUMENTS

| | | | |
|---|---|---|---|
| 4,404,557 | 9/1983 | Grow | 340/825.5 |
| 4,454,508 | 6/1984 | Grow | 340/825.5 |
| 4,459,588 | 7/1984 | Grow | 370/89 |
| 4,566,097 | 1/1986 | Bederman | 370/89 |
| 4,602,365 | 7/1986 | White et al. | 370/89 |
| 4,604,742 | 8/1986 | Hamada et al. | 370/89 |
| 4,609,920 | 9/1986 | Segarra | 340/825.5 |

OTHER PUBLICATIONS

"A Local Communications Network Based on Interconnected Token-Access Rings: A Tutorial" by Norman Strole, IBM J. Res. Develop., vol. 27, No. 5, Sept. 1983.
IEEE Project 802 Local Area Network Standards, Draft IEEE Standard 802.5, Jun. 10, 1983.

Primary Examiner—Douglas W. Olms
Attorney, Agent, or Firm—Antonelli, Terry & Wands

[57] ABSTRACT

In each node accommodated in a token-ring network system, a storage unit for storing priority levels is constituted by a plurality of flip-flops which provide bit positions of the same number as that of grades of the priority level. When storing a value of priority level which is higher than a value of priority level stored in the storage unit, the corresponding flip-flop of the storage unit is set. Two priority encoders connected to the output of the storage unit detect, from data of priority level stored in the storage unit, first and second priority levels and load then on registers, respectively. In accordance with the contents of the registers, the corresponding flip-flop of the storage unit is rest, when each node detects a value of priority level stored in the storage unit.

9 Claims, 13 Drawing Figures

METHOD OF AND APPARATUS FOR STORING PRIORITY LEVELS IN TOKEN-RING NETWORK SYSTEM

BACKGROUND OF THE INVENTION

This invention relates to a method of and an apparatus for storing priority levels in a token-ring network system which permits intercommunication through a ring transmission link.

The token-ring network system has hitherto been known as one of schemes in which a plurality of originators can equally communicate with desired terminators through a common transmission link. Exemplified in FIG. 1 is a system configuration of a general token-ring network system. According to this architecture, four intercommunicative data processors 1A, 1B, C and 1D are accommodated in a transmission link 3 through four associated nodes 2A, 2B, 2C and 2D, and data can be transferred in a direction of arrows shown in FIG. 1 (counterclockwise). A token, a bit sequence of several bytes, for example three bytes, is passed from one node to another around the ring transmission link 3 to give permission to the receiving node to initiate a transmission (a right to transmission of data). Where a data processor (originator) is requesting a data transmission, this data processor acquires a right to transmission when a node associated therewith receives a token, and that node transmits a frame inclusive of the transmission data in place of the received token. When the transmitted frame has once been received by a node associated with a desired receiving data processor (terminator) and thereafter has taken a round on the transmission link 3 to reach the transmitting node associated with the originator, this originator node transmits a token in place of the received frame in order to give a right to transmission to another node. However, the data processor requesting the data transmission is not always permitted to transmit the data whenever the associated node receives the token, because a priority level is defined in data which is requested for transmission by any of the data processors. More specifically, when a node associated with a particular data processor requesting a data transmission receives a token under concurrence of a request by a different data processor for transmission of a data of a higher priority level than that of the data of the particular data processor, the node associated with the particular data processor transmits another token which gives a right to transmission to a node associated with the different data processor requesting the transmission of the higher priority level data.

FIG. 2a illustrates a format of a token 4 to be transferred on the transmission link 3 and FIG. 2b a format of a frame 5 also to be transferred on the link 3. Either of the token 4 and frame 5 contains a starting delimiter (SD) 6 in the header field and an ending delimiter (ED) 8 in the endmost field so that the node can recognize either of the token and frame in unit of packet. Thus, two kinds of packets are used in the system.

The token 4 additionally contains an access control field (AC) 7 which is interposed between the SD 6 and ED 8. The AC 7 exemplarily has one byte and includes, as detailed in FIG. 2a, a priority level sub-field (P) 71 to be written with a encoded value (three bits) of a current priority level (for example, the priority is graded by eight levels), a reservation (priority) level sub-field (R) 74 to be written with a encoded value (three bits) of a priority level of a data reserved for transmission, a token sub-field (T) 72 for indication as to whether a packet of interest is a token 4 or a frame 5 (for example, T="0" is used for indicating the token and T="1" for the frame), and a monitor count sub-field (MC) 73 to be written with a count value (one bit) indicative of the number (frequency) of circulation of the packet along the transmission link 3.

The frame 5 shown in FIG. 2b contains, like the token 4, an SD 6, an AC 7 (having a token sub-field of T="1" as mentioned previously), and an ED 8, with addition of a data field 9 to be written with a transmission data and a frame check field 10 for detection of errors in the transmission data. Although not illustrated in FIG. 2b the data field 9 has, at predetermined locations, sub-fields to be written with codes indicative of an originator and a terminator of the data, respectively.

The operation of the known token-ring network system will now be described with reference to FIG. 1.

In the configuration of FIG. 1, it is indicated by TK (0, 0) with ① that a taken having a current priority level sub-field (P) 71 indicative of "0 (zero)" and a reservation level sub-field (R) 74 indicative of "0 (zero)" has initially been issued from the node 2A. Namely, in FIG. 1, numerals encircled by a symbol "○" indicate sequence of transfer of tokens or frames, and TK with a parenthesis filled with the initial numeral indicative of a value of P and the following numeral indicative of a value of R indicates a token. In connection with the numerals, the larger the numerical value, the higher the priority level is. It is now assumed that upon the issuance of the token TK (0, 0) indicated by ①, the nodes 2B, 2C and 2D are requesting data transmissions, the priority levels, Pm, of transmission data of the nodes 2B and 2C are all zero and only the node 2D has the priority level Pm which is 5, and that the transmission data from each node are all directed to the node 2A standing for a terminator. The node 2B receives the token TK (0, 0) from the node 2A and compares the value of P in this token with the priority level of a data of its own to be transmitted. If the value of P is equal to or smaller than the priority level of the transmission data of its own, the node 2B acquires a right to transmission and transmits a frame inclusive of the transmission data. Since, in this example, the value of P in the token TK (0, 0) from the node 2A is 0 (zero) and the priority level of the data requested for transmission by the node 2B is also 0 (zero) equalling the value of P, the node 2B acquires a right to transmission and transmits a frame $FR_B$ (0, 0) indicated by ② in place of the token TK (0, 0). The symbol $FR_B$ referred to here indicates a frame issued from the node 2B, with its parenthesis filled, like the parenthesis of the token, with the initial numeral indicative of a value of P and the following numeral indicative of a value of R in the access control field 7 of the frame format.

The frame $FR_B$ (0, 0) indicated by ② from the node 2B is received by the node 2C. If the value of reservation level R in the frame $FR_B$ (0, 0) is larger than the priority level of the data of its own to be transmitted, the node 2C rewrites the value of R in the frame $FR_B$ (0, 0) into a new one. In this example, since the priority level of the data which the node 2C intends to transmit is zero equalling the value of R in the frame $FR_B$ (0, 0) the node 2C transmits the frame $FR_B$ (0, 0) received from the node 2B without rewriting it.

The node 2D receives the frame $FR_B$ (0, 0) from the node 2C and compares the priority level (Pm=5) of the data of its own to be transmitted with the value of R in the frame $FR_B$, that is, zero. Since in this example the priority level of the data which the node 2D intends to transmit is larger, the node 2D rewrites the value of reservation level R in the frame $FR_B(0, 0)$ to 5 which is the priority level of the data of its own to be transmitted, thereby transmitting a frame $FR_B(0, 5)$ indicated by ③.

The node 2A receives from the node 2B the transmission data contained in the frame $FR_B(0, 5)$. There is no data that the node 2A intends to transmit and hence the node 2A, after reception of the transmission data from the node 2B, returns to the node 2B the frame $FB_B(0, 5)$ as it is.

When receiving the frame $FR_B(0, 5)$ indicated by ④, the node 2B recognizes that the data transmitted from its own node has taken a round on the transmission link 3, that is, the data transmission of its own has been completed. The node 2B then issues a token in place of the frame $FR_B(0, 5)$. Concurrently, the node 2B examines the value of reservation level R to recognize that there is a node which intends to transmit the data having the priority level measuring 5. Then, for the sake of urgently transferring the right to transmission to the node requesting the transmission of the data having the priority level "5", that is, to the node 2D, the node 2B transmits a token TK (5, 0) indicated by ⑤. It should therefore be noted that the node 2B has rewritten the value "0" of current priority level in the token TK (0, 0), indicated by ① received previously from the node 2A, into 5 in the token TK (5, 0) indicated ⑤. Following the rewriting to the priority level in the token, the node 2B stores both of the current priority level i.e., 5 and the previous priority level i.e., 0.

Since the priority level P i.e., 5 in the token TK (5, 0) from the node 2B is higher than the priority level i.e., 0 of the data the node 2C intends to transmit, the node 2C is not permitted to transmit the data of its own and transfers to the node 2D the token TK (5, 0) as it is.

Receiving the token TK (5, 0), the node 2D recognizes that the value of priority level P in the token equals the priority level of the data of its own to be transmitted, acquiring a right to transmission and transmits a frame $FR_D(5, 0)$ indicated by ⑥ in place of the token TK (5, 0). The symbol $FR_D$ referred to here indicates a frame issued from the node 2D.

Gathering from the operation of each node set forth so far, it will be understood easily that the frame $FR_D(5, 0)$ transmitted from the node 2D will remain unchanged so as to take a round on the transmission link 3, thereby returning, as designated at the frame $FR_D(5, 0)$ indicated by ⑦, to the node 2D. By receiving the frame $FR_D(5, 0)$, the node 2D recognizes that the transmission of the data of its own has been completed. Accordingly, the node 2D transmits a token which substitutes for the frame $FR_d(5, 0)$ and which is TK (5, 0) indicated by ⑧. The value of priority level P in the TK (5, 0) indicated by ⑧ is set to be 5 because this token should urgently be transferred to the node which has previously raised the priority level in the token to 5 (in this example, the node 2B). If the node 2D transmits a token TK (0, 0), a node (in this example, node 2A) next to the node transmitting the data of the high priority level will always have the advantage of data transmission and equality in communication by the nodes on the transmission link 3 will be impaired.

When receiving the token TK (5, 0) issued from the node 2D and transferred via the node 2A, the node 2B compares the value "5" of priority level P in that token TK (5, 0) with the priority level in the token which has previously been rewritten and stored in the node 2B. Coincidence in this comparison means that the node 2B is identified as the node which has raised the priority level in the current token TK (5, 0) and therefore, it is necessary for the node 2B to lower the priority level in this token TK (5, 0) to the priority level which has measured prior to rewriting and stored in the node 2B. This allows position and state of that token to be reset to those which have measured prior to the occurrence of the request by the node 2D for the transmission of the higher priority level data, thereby maintaining equality in communication by the node in the transmission link 3. Consequently, the node 2B transmits a token TK (0, 0) indicated by ⑨.

As will be seen from the above, when each node has raised by itself the priority level in the token, each node must store a pair of values of un-rewritten and rewritten priority levels. In addition, there is a possibility that each node sequentially performs operations to raise the priority level, without interrupted by lowering the priority level.

Conventionally, each node has a first-in last-out (FILO or stack) register of relatively large memory capacity as a means for storing values of the paired priority levels, requiring a complicated circuit adapted to control write/read operations of the values. Taking the above example, for instance, the 8 priority levels ranging level "0" to level "7" are set and therefore, when a particular node performs the maximum number of operations to raise the priority level, four operations for raising priority level "0" to level "1", level "2" to level "3", level "4" to level "5" and level "6" to level "7" are carried out by the particular node in the order mentioned. Accordingly, the FILO (stack) register of each node has a nesting of four levels. It follows therefore that in the above example, memory capacity of the FILO register in each node is required to be 3 (bits)×2×4 (nesting levels)=24 bits.

Prior to describing a conventional method of storing priority levels, details of the respective nodes shown in FIG. 1 will first be described with reference to FIG. 3. Although the node 2B is exemplarily broken down in FIG. 3, it should be noted that each of the other nodes 2A, 2C and 2D has the same internal circuit construction. A frame or token outputted from the node 2A is passed through the transmission link 3 so as to be fed to a bit rewrite circuit 32 and a shift register 33 via a receiver 30. The shift register 33 converts the frame or taken into a parallel receiving data which in turn is supplied to a frame/token detector circuit 34 and a receiving data first-in first-out (FIFO) register 38. Thus, only the received data is sent to the data processor 1B via a data bus. The bit rewrite circuit 32 is responsive to a rewrite data from the frame/token detector circuit 34 to rewrite the value of reservation level in the access control field 7 of the frame or token. Values of priority level sub-field P and reservation level sub-field R in the access control field 7 of the frame or token are sent from the frame/token detector circuit 34 to a priority level storing (and controlling) circuit 35. Based on the received values, the circuit 35 controls a frame or token to be transmitted.

For transmission, the priority level storing (and controlling) circuit 35 supplies to a token/frame generator circuit 36 values written in the access control field 7 of the frame or token to be transmitted. A transmission data from the data processor 1B is sent via the data bus to a transmitting data first-in first-out register 39 and fed, as a parallel transmission data, to a shift register 37. A transmission data from the token/frame generator circuit 36 is also fed, as a parallel transmission data, to the shift register 37. The transmission data from the shift register 37 is sent via a driver 31 to the transmission link 3 and transmitted to the node 2C.

The schematic construction of the conventional priority level storing circuit 35 shown in FIG. 3 is illustrated in FIG. 4. Referring to FIG. 4, the priority level storing circuit 35 comprises a frame priority level register 14 for storing a value Pr of current priority level in the access control field 7 of a frame, a reservation level register 15 for storing a value Rr of the reservation level, a priority level controller 13 for judging the relation between magnitudes of the priority levels, an FILO controller 16, 16', a first priority level FILO register 17, a second priority level FILO register 18, a first priority level read register 19, and a second priority level read register 20.

The conventional priority level storing circuit 35 schematically shown in FIG. 4 is further detailed in FIG. 5. The operation of this circuit 35 will now be described with reference to FIG. 5.

Firstly, the operation will be explained by referring, as an example, to the reception by the node 2B of the frame $FR_B(0, 5)$ indicated by ④, shown in FIG. 1, and the transmission by the node 2B of the token TK (5, 0) indicated by ⑤, also shown in FIG. 1. When the node 2B receives the frame $FR_B(0, 5)$, a binary value "000" (or decimal "0") is loaded on the register 14 of FIG. 5 and a binary value "101" (or decimal "5") is loaded on the register 15 of FIG. 5. A comparator 44 compares contents Pr and Rr of the registers 14 and 15 and supplies a signal indicative of Pr<Rr to a priority level judging circuit 47. On the other hand, the registers 19 and 20 have already been loaded with contents Sx and Sr of "000", respectively, because in this example the node 2B has the priority level Pm which is "0". Consequently, a comparator 43 supplies a signal indicative of Pr=Sx and a comparator 45 supplies a signal indicative of Rr>Sr, to the priority level judging circuit 47. An input/output control circuit 41 is so configured as to write the value of priority level from a selector circuit 46 to the FILO register 18 and the same value also to the register 20, ensuring that the content of the register 20 coincides with the content at the top level of the FILO register 18. In exact similarity, the content of the register 19 coincides with the content at the top level of the FILO register 17. The priority level judging circuit 47 obtains conditions Pr<Rr and Pr>Sx from a combination of the signals delivered out of the comparators 43, 44 and 45. Under the above conditions, the circuit 47 issues a control signal to the selector circuit 46 so as to cause the same to connect the content Pr of the register 14 to the input/output control circuit 41 and connect the content Rr of the register 15 to an input/output control circuit 42. At the same time, the priority level judging circuit 47 sends write signals to control circuits 16 and 16' in order that the input/output control circuits 41 and 42 can write the values from the selector circuit 46 into the associated FILO registers 18 and 17. Consequently, as described previously, the content Rr (in this example, "101") of the register 15 is loaded on the register 19 and the content Pr (in this example, "000") of the register 14 is loaded on the register 20.

Next, the operation of the FIG. 5 circuit will be described by referring, as an example, to the node 2B receiving the token TK (5, 0) indicated ⑧ and then transmitting the token TK (0, 0) indicated by ⑨ in FIG. 1. When the node 2B receives the token TK (5, 0), a binary value "101" is loaded on the register 14 of FIG. 5 and a binary value "000" on the register 15. As described previously, since the content Sx of the register 19 is "101" and the content Sr of the register 20 is "000", the comparator 43 supplies a signal indicative of Pr=Sx and the comparator 45 supplies a signal indicative of Rr≦Sr, to the priority level judging circuit 47. The priority level judging circuit 47 thus obtaining conditions Rr≦Sr and Pr=Sx supplies read signals to the control circuits 16 and 16', causing the associated FILO (stack) registers 17 and 18 to pop up. The input/output control circuits 41 and 42, on the other hand, respond to switching signals from the control circuits 16' and 16 to change their input/output modes, so that the contents at the second level of the FILO (stack) registers 18 and 17, which have been popped up and read out, are written into the associated registers 20 and 19. In this case, both the registers 19 and 20 are written with "000". Concurrently, the priority level judging circuit 47 controls the selector circuit 46 such that the contents of the registers 19 and 20 are sequentially switched to provide a data which is necessary for generation of the token TK (0, 0) and sent to the token/frame generator circuit 36 (FIG. 3). To add, when the reservation level loaded on the register 15 is smaller than the priority level loaded on the register 14, the priority level storing circuit 35 is not brought into any operation.

As described above, the conventional priority level storing circuit 35 requires such sophisticated operations as stacking operations for the FILO registers 17 and 18 and switching operations for the input/output control circuits 41 and 42, resulting in the complicated construction. Moreover, the memory capacity of the FILO registers 17 and 18 must in all be 24 bits.

The token-ring network system is disclosed in "A Local Communications Network Based on Interconnected Token-Access Rings: A tutorial" by Norman C. Strole, IBM J. RES. DEVELOP., Vol. 27, No. 5, pp 481-496, September, 1983 and "Draft IEEE Standard 802.5, Token Ring Access Method and Physical Layer Specifications", pp 17-19, June 10, 1983.

SUMMARY OF THE INVENTION

It is an object of the present invention to provide a method of storing priority levels which can admit minimized memory capacity for storing priority levels.

Another object of the invention is to provide an apparatus for implementation of the priority level storing method which can be simplified structurally.

Essentially, the present invention is based on the fact that each node accommodated in the token-ring network system, when writing a pair of current and reservation priority levels into its storage means, necessarily writes only a pair of priority levels which are higher than those of another pair which has previously been written and when transmitting a token of lowered priority levels, necessarily reads a pair of stored priority levels which are higher than those of the other pairs. Each node may simply be provided with a register having the same number of bits as that of grades of the priority level and advantageously, the individual bits of the register may selectively be set/reset to perform a write/read operation of a pair of priority levels.

DESCRIPTION OF THE PREFERRED EMBODIMENTS

The invention will now be described by way of example with reference to FIGS. 6 to 12.

Prior to specifically describing the invention, the essential points of the priority level will be clarified in the following.

Figure 5:
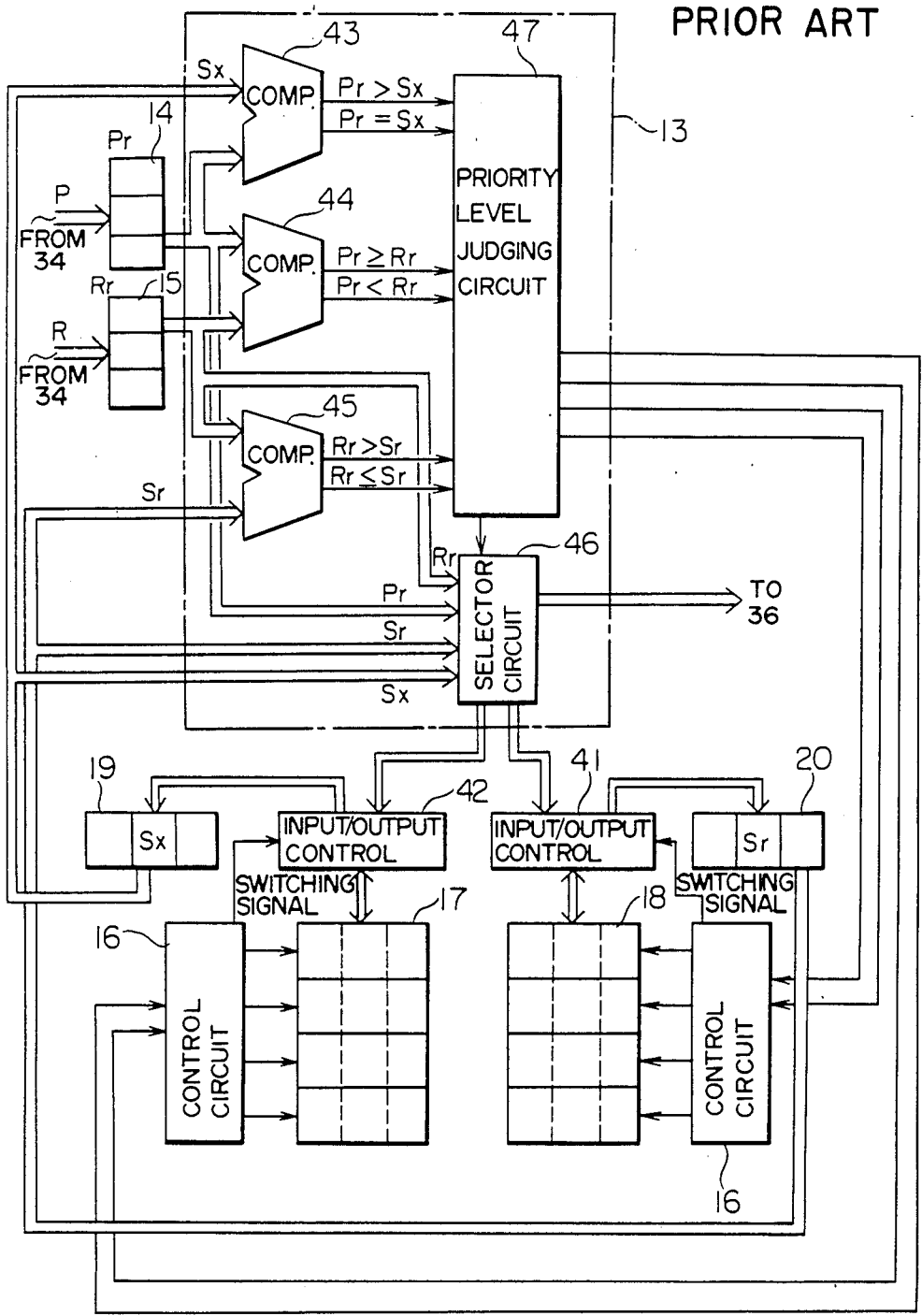
FIG. 5 is a block diagram detailing the construction of the prior art priority level storing circuit of FIG. 4.

(1) The priority level is established in the form of a pair of values, one being for a first priority level register 19 and the other for a second priority level register 20 (See FIG. 5).

(2) The value, Sx, of the first priority level register 19 is necessarily larger than the value, Sr, of the second priority level register 20.

(3) When comparing together, in the presence of a plurality of pairs of data pieces representing paired first and second priority levels, a value Sx of the first priority level and a value Sr of the second priority level which are precedingly written into the storage means and a value Sx of the first priority level and a value Sr of the second priority level which are succeedingly written into the storage means, there result the succeedingly written value Sx of the first priority level which is larger than the succeedingly written value Sr of the second priority level, and the succeedingly written value Sr of the second priority level which is larger than the precedingly written value Sx of the first priority level.

(4) With the values of the first and second priority levels written into the storage means in the same manner as in item (3) above, when the precedingly written value of the first priority level equals the succeedingly written value of the second priority level, these values of the first and second priority levels are erased, and the precedingly written value of the second priority level and the succeedingly written value of the first priority level are brought into existence. This is a special processing which is performed when the same node continuously raises the priority level and will not be detailed herein. (5) The first priority level can vary within a range excluding the lowermost value which is indicated by $7 \geq Sx \geq 1$ and the second priority level can vary within a range excluding the uppermost value which is indicated by $6 \geq Sr \geq 0$.

Figure 6:
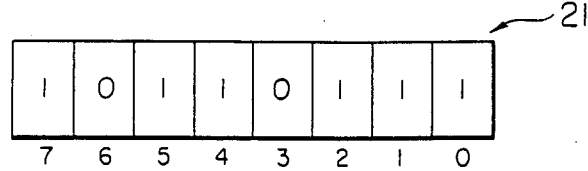
FIG. 6 is a schematic representation of a bit state in a storage unit useful in explaining the principle of the invention.

As far as requirements stipulated by items (1) to (5) above are satisfied, the values of the first and second priority levels to be written into the storage means will not overlap with each other. Also, the plurality of pairs of the first and second priority levels to be written into the storage means will not overlap with each other. Accordingly, on the ground of the properties of the priority level in the presence of the plurality of pairs of data pieces representing paired first and second priority levels, a storage unit having bit positions corresponding to individual values of the priority level is provided and values of the paired priority levels are stored into the storage unit by writing logical values "1" into bit positions corresponding to these priority level values. FIG. 6 illustrates a storage state wherein bits set with "1" represent stored values of the priority levels. Assuming that, as shown in FIG. 6, the bit state of the storage unit, designated by reference numeral 21, is represented by "10110111" for a node, it will be seen that three pairs of priority levels, a pair of levels "7" and "5", a pair of levels "4" and "2" and a pair of levels "1" and "0", are stored in the storage unit 21. This means that the node of interest has first raised the priority level from level "0" to level "1", then from level "2" to level "4" and thereafter from level "5" to level "7". Among the plurality of pairs of the priority levels corresponding to the bit positions "1", the first and second priority levels are defined in each pair from higher to lower values of the priority levels, so that values of the first and second priority levels in each pair may be discriminated from each other. Thus, the storage unit may satisfactorily have the bit capacity which is identical in number to grades of the priority level.

Figure 7:
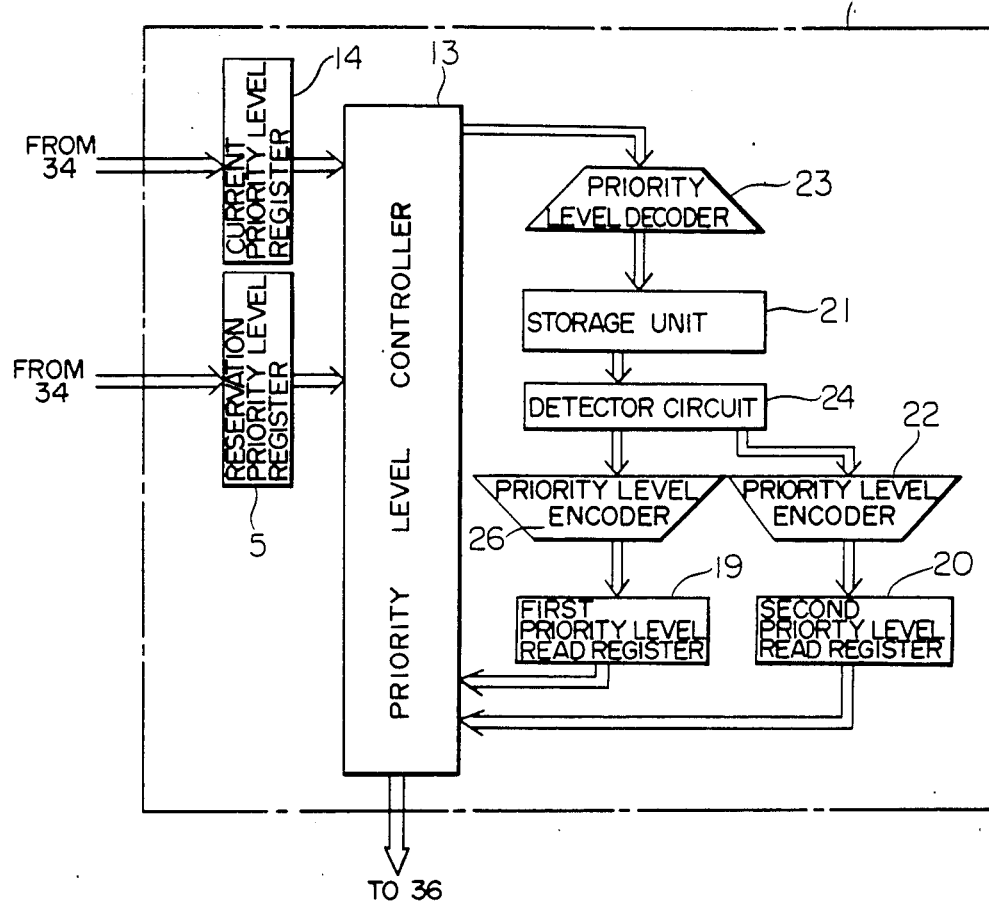
FIG. 7 is a schematic diagram showing the construction of a priority level storing circuit according to an embodiment of the invention.

A preferred embodiment of a priority level storing circuit utilizing the one-bit binary priority levels in accordance with teachings of the invention is schematically illustrated in FIG. 7. Referring to FIG. 7, the priority level storing circuit comprises a current priority level register 14, a reservation priority level register 15, a priority level controller 13, a priority level decoder 23, a storage unit 21 having bit positions which are identical in number to grades of the priority level, a detector circuit 24, a first priority level encoder 26, a second priority level encoder 22, a first priority level register 19, and a second priority level register 20.

In operation, upon transmission of a frame, a value P of current priority level written in the access control field 7 of the transmitted frame is inputted to the current priority level register 14. After the frame has taken a round, a value R of reservation level in the access control field 7 is inputted to the reservation priority level register 15, and the relation between magnitudes of these values is judged by the priority level controller 13 as in the precedence. When the value Pr of the priority level register 14 is determined to be smaller than the value Rr of the reservation level register 15, indicating Pr<Rr, the value Rr of the reservation level register 15 is decoded by the priority level decoder 23 and according to a result of decoding, a logical value "1" is written into a bit position of the storage unit 21 corresponding to the priority level value. Subsequently, the value Pr of the priority level register 14 is similarly written into the storage unit. Then, the highest priority level value of output values from the storage unit 21 is detected by the detector circuit 24 as a value Sx of the first priority level which in turn is inputted to the first priority level register 19 via the first priority level encoder 26. A secondly high priority level value (next to the highest value) of the output values from the storage unit 21 is also detected by the detector unit 24 as a value Sr of the second priority level which in turn is inputted to the second priority level register 20 via the second priority level encoder 22. By repeating the above operations plural times, the plurality of pairs of data pieces as shown in FIG. 6 representing paired first and second priority levels are obtained in the storage unit 21. When a token having a lowered priority level value is transmitted, a logical value "0" is written into a bit position of the storage unit 21 corresponding to the lowered value and data representative of the values Sx and Sr of the first and second priority levels is erased. Thus, as compared to the prior art FILO priority level storing scheme utilizing the 3-bit binary priority level, the configuration of this embodiment permits reduction in the memory capacity, thereby ensuring storage of the priority level values in the bit positions which are identical in number to the priority level grades.

Figure 9:
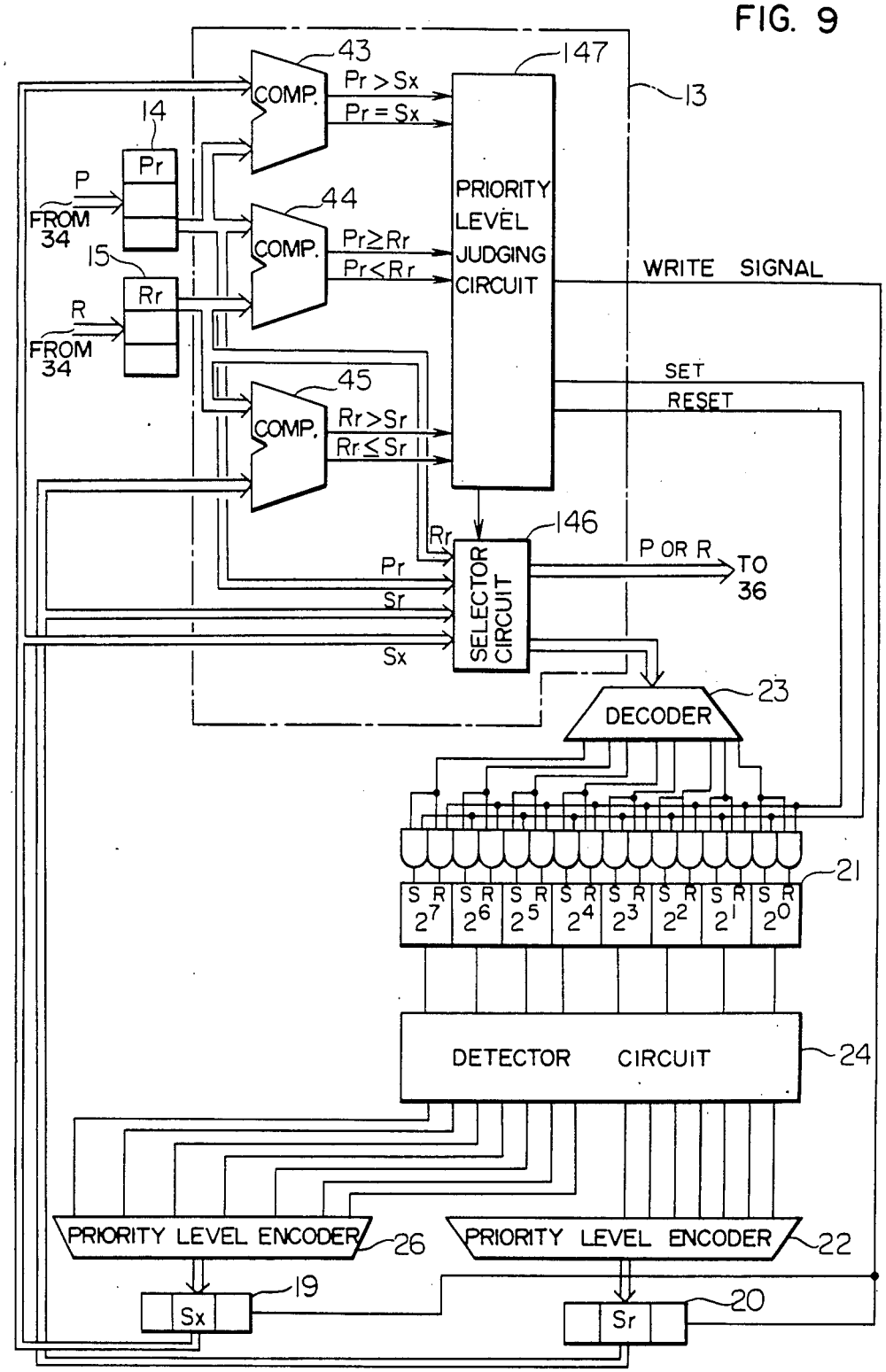
FIG. 9 is a block diagram detailing the construction of the priority level storing circuit of FIG. 7 according to the invention.

The construction of priority level storing circuit 35 according to the above embodiment of this invention is detailed in FIG. 9. The operation of the FIG. 9 priority level storing circuit 35 will be described with reference to FIGS. 6 and 10.

Figure 1:
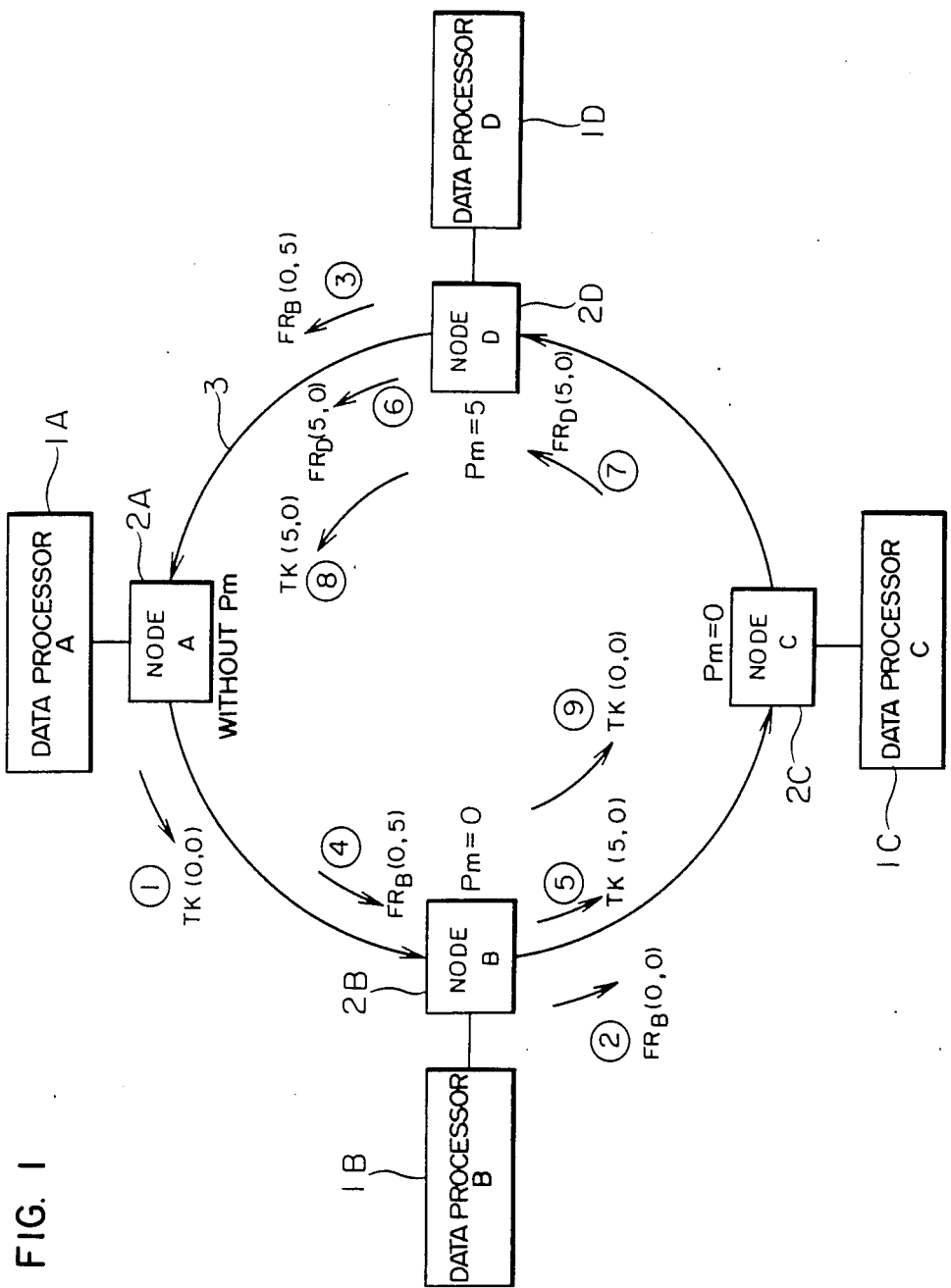
FIG. 1 is a schematic diagram for explaining a general token-ring network system according to the token-ring scheme.
Figure 2A:
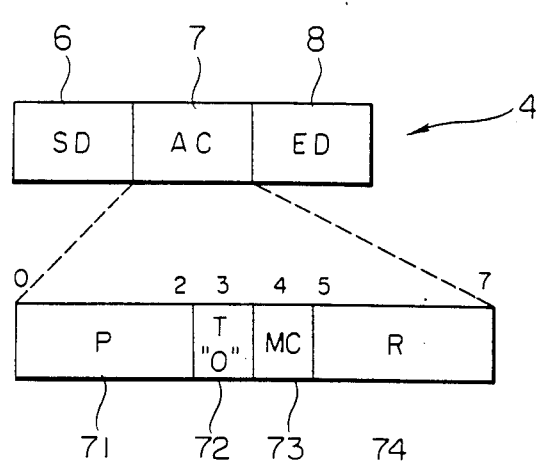
FIG. 2a shows a format of a token passed through a transmission link shown in FIG. 1.
Figure 2B:
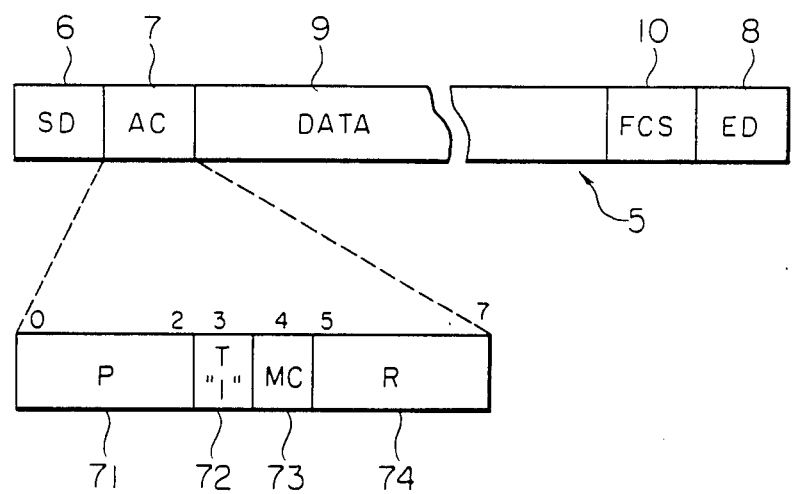
FIG. 2b shows a format of a frame passed through the transmission link.
Figure 3:
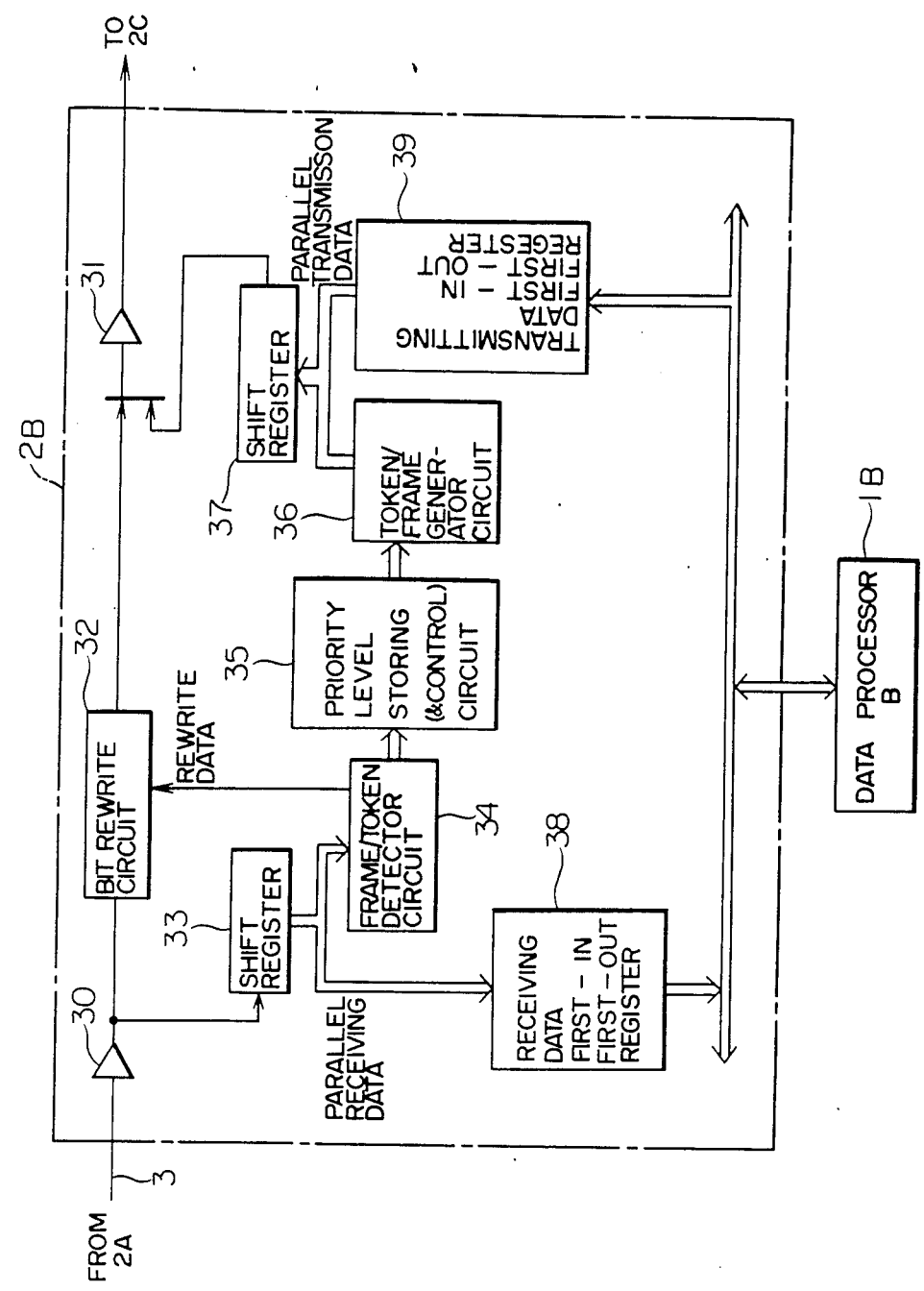
FIG. 3 is a schematic block diagram showing the construction of each node of the system shown in FIG. 1.
Figure 4:
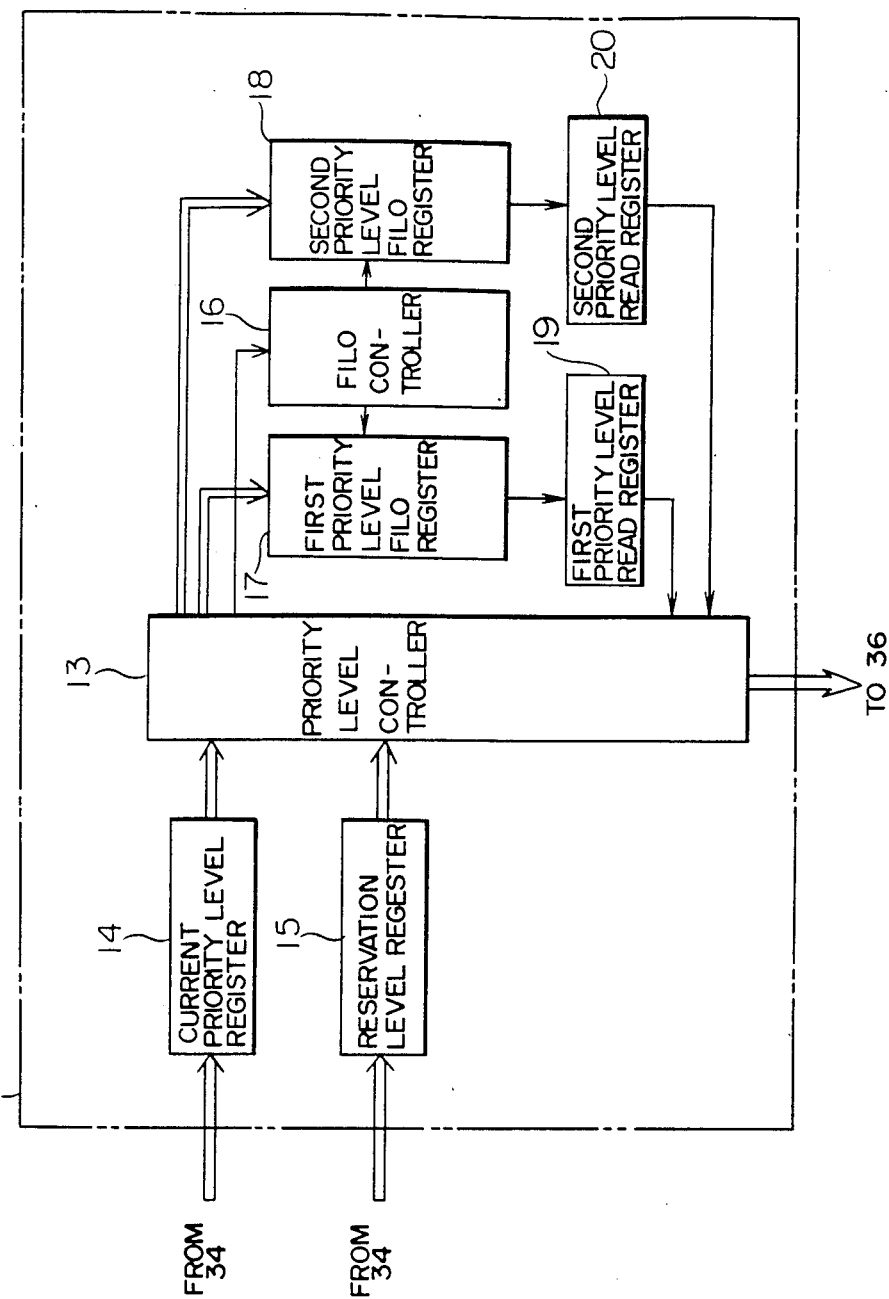
FIG. 4 is a schematic block diagram showing the construction of a prior art priority level storing circuit.

Like the previous description given in connection with the prior art priority level storing circuit 35 shown in FIG. 5, the operation will first be described by referring, as a example, to the reception by the node 2B of the frame $FR_B(0, 5)$ indicated by ④ in FIG. 1 and the transmission by the same node of the token TK (5, 0) indicated by ⑤. When the node 2B receives the frame $FR_B(0, 5)$, "000" is loaded on the register 14 in FIG. 9 and "101" on the register 15. As a result, a comparator 44 supplies a signal indicative of Pr<Rr and a comparator 45 supplies a signal indicative of Rr>Sr, to a priority level judging circuit 147. From the signals delivered out of the comparators 43 to 45, the priority level judging circuit 147 obtains conditions Pr<Rr and Pr>Sx and sends a set signal to the storage unit 21 and a control signal to a selector circuit 146, thereby causing the selector circuit 146 to pass the value Rr of the register 15 to the decoder 23.

The storage unit 21 comprises RS flip-flops which are identical in number to grades of the priority level. Each RS flip-flop has an S input terminal and an R input terminal respectively connected to AND gates. One input of the AND gate whose output is connected to the S input terminal of the flip-flop is supplied with the set signal delivered out of the priority level judging circuit 147. One input of the AND gate whose output is connected to the R input terminal of the flip-flop is supplied with a reset signal from the priority level judging circuit 147. The other inputs of all of the AND gates are connected with bit output lines of decoder 23 corresponding to the respective AND gates. With this construction, only a flip-flop representative of a bit corresponding to one decoded signal delivered out of the decoder 23 responds to the set signal or reset signal from the priority level judging circuit 147 to selectively change its output signal.

Figure 8:
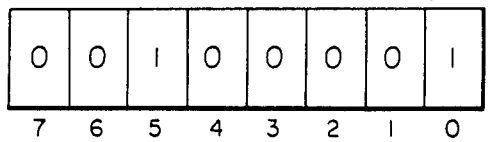
FIG. 8 is a schematic representation of a bit state in the storage unit useful in explaining the operation of the priority level storing circuit shown in FIG. 7.

The decoder 23 decodes the value Rr ("101") of register 15 sent from the selector circuit 146 to generate a decoded signal which gives the "1" level to only an output line corresponding to bit "5". Since the set signal has been supplied from the priority level judging circuit 147 to the storage unit 21, only a flip-flop of storage unit 21 corresponding to the bit "5" is written with the "1". Similarly, the priority level judging circuit 147 sends the set signal to the storage unit 21 and the control signal to the selector circuit 146, causing the selector circuit 146 to pass the value Pr of the register 14 to the decoder 23. Then, the decoder 23 decodes the value Pr ("000") of register 14 sent from the selector circuit 146 to generate a decoded signal which gives the "1" level to only an output line corresponding to bit "0". At this time, therefore, only a flip-flop of storage unit 21 corresponding to the bit "0" is written with the "1". Eventually, the storage unit 21 has a stored bit state as shown in FIG. 8.

Figure 10:
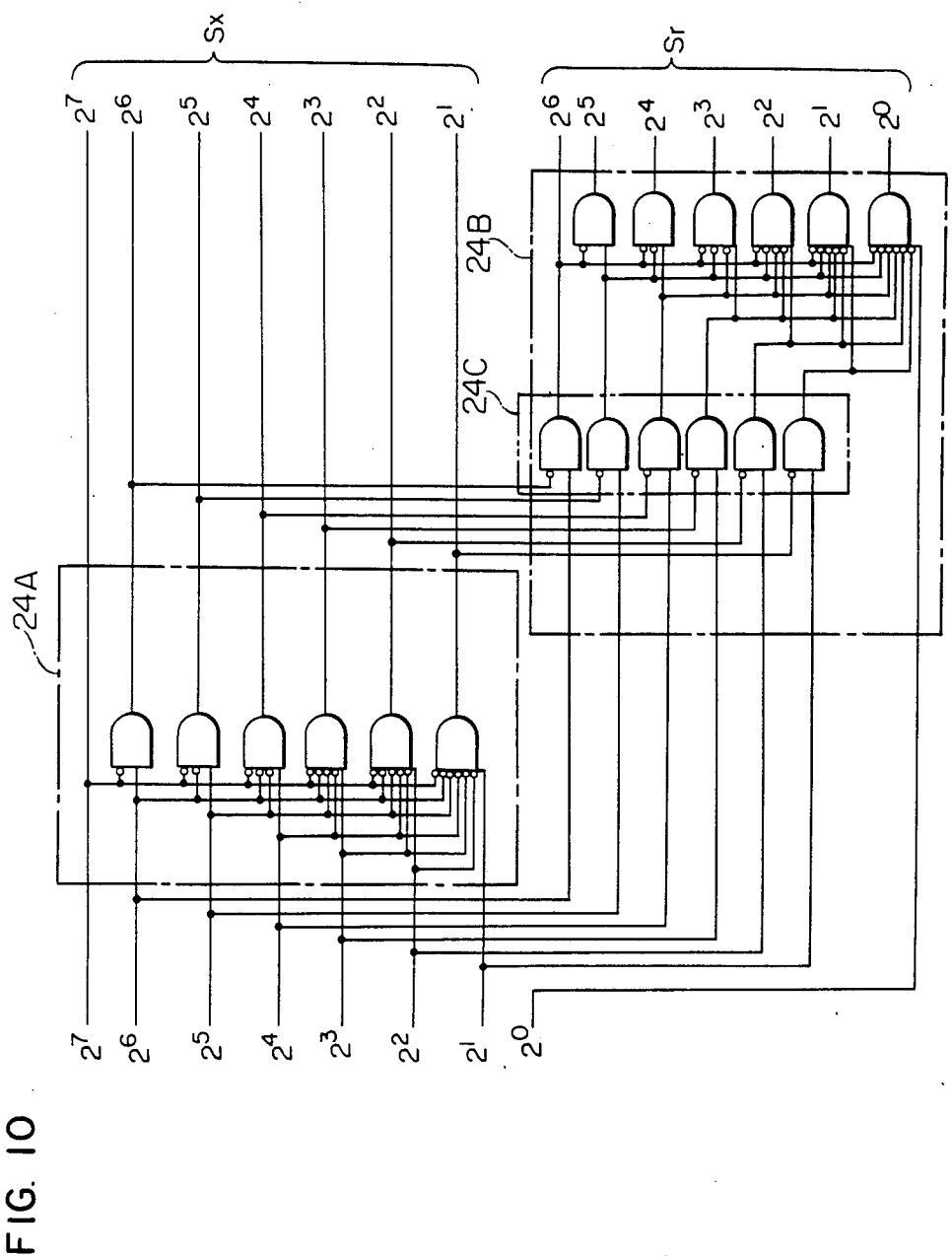
FIG. 10 is a circuit diagram detailing the construction of a detector circuit used in the priority level storing circuit of FIG. 9.

Output signals representative of bits "0" to "7" from the storage unit 21 are supplied to a detector circuit 24. As shown in FIG. 10, the detector circuit 24 comprises a first priority encoder circuit 24A and a second priority encoder circuit 24B. The first priority encoder circuit 24A, which is adapted to detect a bit position of the first priority level from the content of the storage unit 21 and to generate a encoded output signal indicative of the bit position, is supplied with the output signals representative of bits "1" to "7" from the storage unit 21. The first priority encoder circuit 24A is disconnected from the output signal representative of bit "0" of the storage unit 21 because the first priority level is permitted to lie within the range of from bits "1" to "7". The second priority encoder circuit 24B is likewise adapted to encode the output signals representative of bits "0" to "6". The second priority encoder circuit 24B is, however, gated by an AND gate group 24C so that any bit positions of the first priority level encoded by the first priority encoder circuit 24A may be excluded from objects to be encoded by the second priority encoder circuit 24B. This allows the second priority encoder circuit 24B to detect any bit position of the second priority level and to generate an output signal representative of a bit position of the second priority level. The second priority encoder circuit 24B is disconnected from the output signal representative of bit "7" of the storage unit 21 because the second priority level is permitted to lie within the range of from bits "0" to "6".

The first and second priority levels delivered out of the detector circuit 24 are sent to the encoders 26 and 22, respectively, to provide the value Sx of the priority level and the value Sr of the second priority level. Upon completion of writing a pair of first and second priority levels into the storage unit 21, a write signal is sent from the priority level judging circuit 147 to the registers 19 and 20 so as to load the value Sx ("101") of the first priority level on the first priority level register 19 and the value Sr ("000") of the second priority level on the second priority level register 20. The sequence of supply of the values Pr and Rr from the registers 14 and 15 to the decoder 23 is not definite as exemplified herein but may be reversed.

Next, the operation of the FIG. 9 circuit according to the invention will be described by referring, as an example, to the reception by the node 2B of the token TK (5, 0) indicated by ⑧ in FIG. 1 and the transmission by the same node of the token TK (0, 0) indicated by ⑨.

When the node 2B receives the token TK (5, 0), "101" is loaded on the register 14 in FIG. 9 and "000" on the register 15. As described previously, since the content, Sx, of the register 19 has been set to "101" and the content, Sr, of the register 20 to "000", the comparator 43 supplies a signal representative of Pr=Sx and the comparator 45 supplies a signal representative of Rr≦Sr, to the priority level judging circuit 147. From the comparison results, the priority level judging circuit 147 obtains conditions Rr≦Sr and Pr=Sx and under the conditions, generates the reset signal and controls the selector circuit 146 to cause it to pass the value Sx ("101") in the register 19 to the decoder 23. Since the reset signal from the priority level judging circuit 147 has been applied to the AND gate group at the input stage of the storage unit 21, the "1" in bit "5" of the storage unit 21 is rewritten into "0". Therefore, the priority level judging circuit 147 controls the selector circuit 146 to cause it to pass the value Sr ("000") in the register 20 to the decoder 23. By this, the "1" in bit "0" of the storage unit 21 is rewritten into "0". Upon completion of rewriting the content of bit "5" of the storage unit 21 into "0", the contents of the registers 19 and 20 remain unchanged because the registers 19 and 20 are inhibited from being written during the rewriting. After the contents of the two bit positions of storage unit 21 corresponding to the first and second priority levels have been rewritten into "0", that is, rewriting of the pair of priority levels has been completed, the priority level judging circuit 147 issues the write signal to load "000" on the registers 19 and 20.

In this manner, according to the invention, the write/read operation of the pair of priority levels can be accomplished using the storage unit 21 which has even the duly minimized capacity.

In the embodiment set forth thus far, 8 values of the priority level are encoded into 3-bit codes to provide the values of current priority level P and reservation level R which are written in the access control field 7 of the token 4 or frame 5. However, since according to the invention the storage means has the same number of bits as that of grades of the priority level, the values of the priority level without being encoded into 3-bit codes may directly be used as the values of priority level P and reservation level R to be written in the access control field 7 to thereby further simplify the construction of the priority level storing circuit included in each node. If the number of grades of priority level is 20 or less at the most, a corresponding increase in the bit number will be of no significance.

Figure 11:
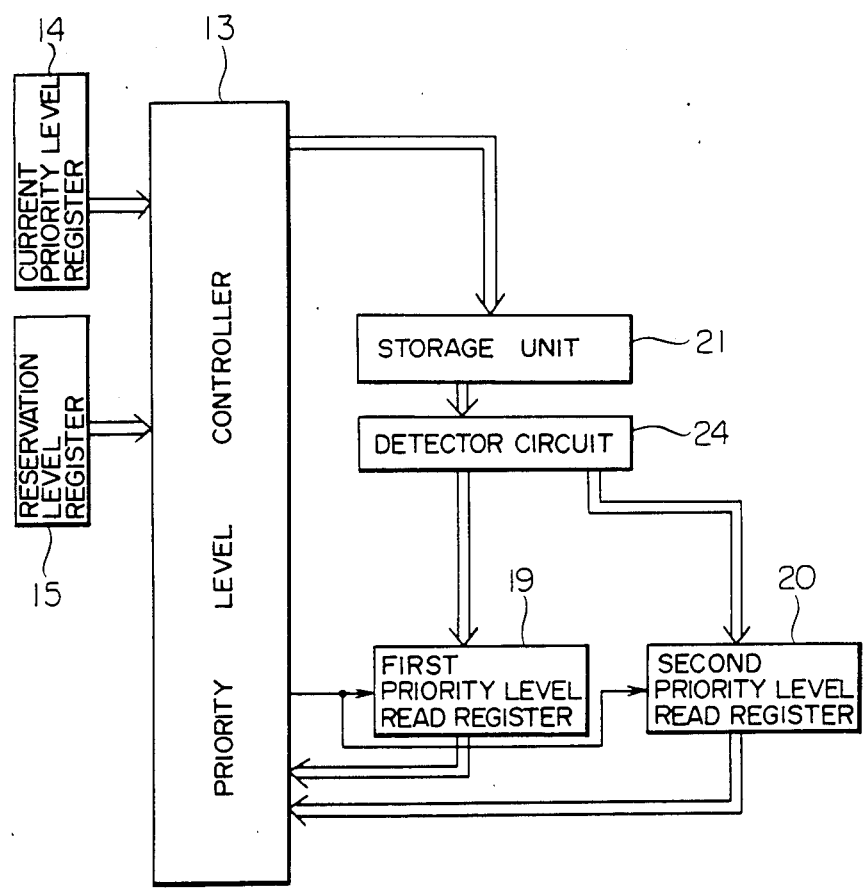
FIG. 11 is a schematic diagram showing the construction of a priority level storing circuit according to another embodiment of the invention.

FIG. 11 illustrates another embodiment of priority level storing circuit according to the invention. Assuming that the priority level is graded into, for example, four values, the values of priority level sub-fields P and R have each priority level bit positions of four bits $a^0$ to $a^3$ and a logical value "1" representative of a data takes place in only one of the four bits. For example, when the priority level has four values 0 to 3, its value "1" is represented by "0010" and its value "3" by "1000".

As schematically shown in FIG. 11, the priority level judging circuit according to the second embodiment comprises a current priority level register 14 inputted with a value Pr of current priority level, reservation level register 15 inputted with a value Rr of reservation priority level, a priority level controller 13 for selecting the priority level, a storage unit 21 having the same number of bits as that of grades of the priority level, a detector circuit 24 for detecting from output signals of the storage unit 21 the highest value of priority levels and the secondly high value (next to the highest value) of priority level, and first and second priority level registers 19 and 20 inputted with output data of the detector circuit 24.

Figure 12:
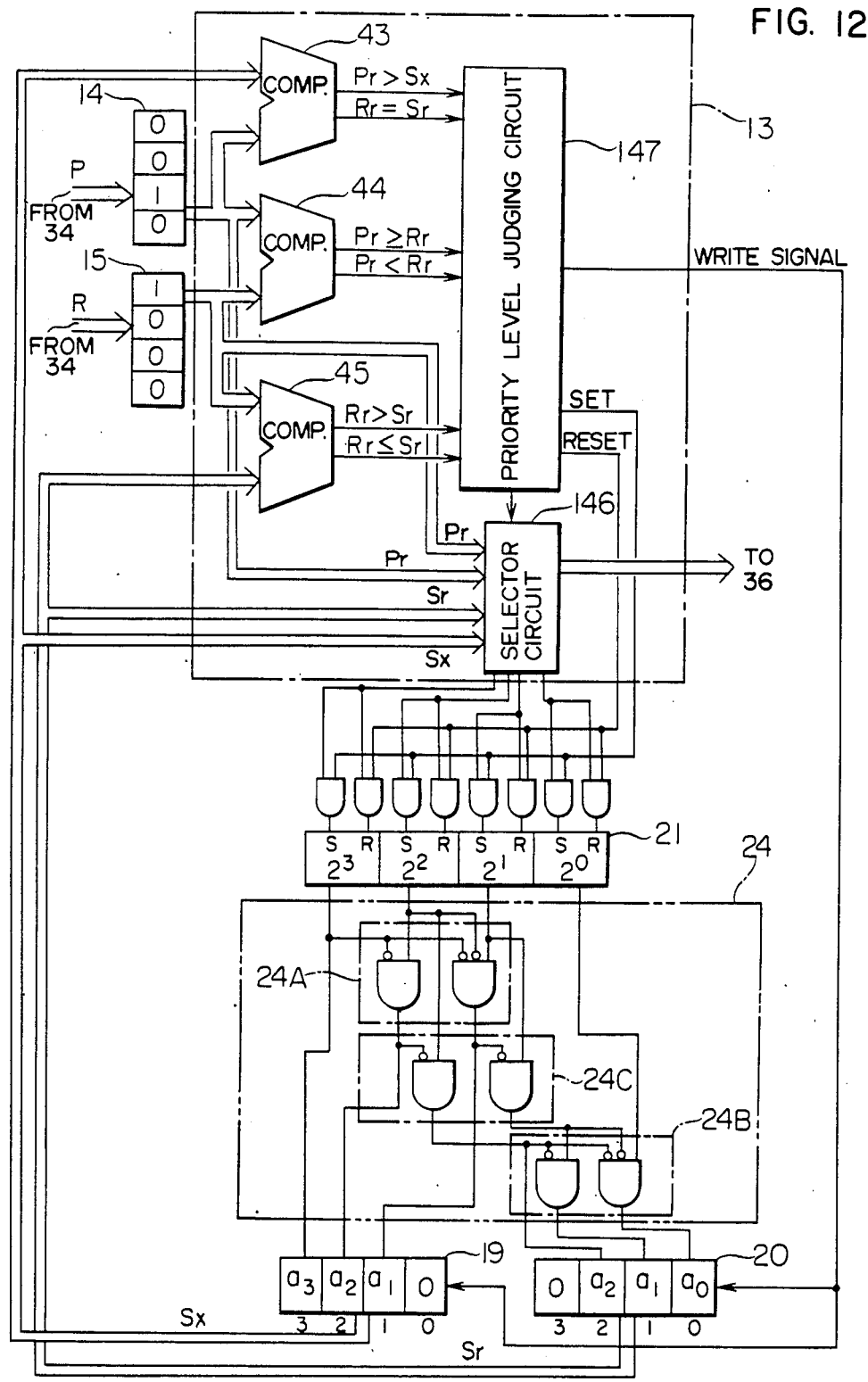
FIG. 12 is a block diagram detailing the construction of the priority level storing circuit of FIG. 11 according to the invention.

The construction of the FIG. 11 priority level storing circuit 35 is detailed as shown in FIG. 12.

Being significantly different from the construction of FIG. 9, this construction of FIG. 12 dispenses with the decoder 23 interposed between the selector circuit 146 and storage unit 21 as well as the encoders 26 and 22 interposed between the detector circuit 24 and registers 19 and 20. In addition, since in this embodiment the priority level is graded into four values, the number of bits of the storage unit 21 and of registers 19 and 20 is reduced correspondingly. Further, circuit components 24A, 24B and 24C of the detector circuit 24 are simplified structurally in proportion to the decreased grades of the priority level.

In the embodiment of FIG. 12, value "1" ("0010") of current priority level P is loaded on the register 34 and value "3" ("1000") of reservation level R on the register 15. A priority level judging circuit 147 writes the values of a pair of priority levels into the storage unit 21 in a manner similar to that explained in connection with the embodiment of FIG. 9. As a result, the content of the storage unit 21 becomes "1010". A detector circuit 24 receives an output signal representative of that content from the storage unit 21 to prepare a value Sx of the first priority level and a value Sr of the second priority level which are directly loaded on the registers 19 and 20, respectively.

As will be seen from the precedence, the value Sx of the first priority level is permitted to lie within a range of from "1" to "3" and the value Sr of the second priority level is permitted to lie within a range of from "0" to "2", and the detector circuit 24 therefore provides the content of 3 bits for each of the registers 19 and 20. In particular, the lowermost bit of the register 19 and the uppermost bit of the register 20 are both fixed to "0" and the "0" bit is added to the corresponding 3 bits to provide the 4-bit value of priority level for each register. In the example herein, therefore, the value Sx as represented by "1000" is loaded on the register 19 and the value Sr as represented by "0010" on the register 20.

The bit written in the storage unit 21 can be reset, namely, rewritten into "0" in a similar manner to that explained in connection with the circuit of FIG. 9.

It will be appreciated from the above description that even when the value of priority level written in the access control field is subject to modification to a priority bit correspondence format, i.e., without encoding format the priority level can be controlled with reduced capacity of the storage unit as in the first embodiment.

We claim:

1. A method of storing priority levels in a token-ring network system having a ring transmission link and a plurality of nodes accommodated in the ring transmission link, each node being capable of transmitting/receiving a token and a frame, wherein each node can reserve in a frame being passed through said transmission link a priority level for a frame that the node of its own requests for transmission and can transmit the frame of its own requested for transmission when acquiring a right to transmission by receiving a token, said method comprising, for storing priority levels at each node, the steps of:

reading, upon receipt of the frame transmitted from its own node, values of current and reservation priority levels;

compairing the read values of both the priority levels and storing, when the value of reservation level is higher than the value of current priority level, said value of reservation level in storing means having the same number of bits as that of grades of the priority level with bit positions respectively corresponding to values of the priority level, by setting to one state a value at a bit position of said storing means corresponding to at least said value of reservation level;

reading, upon receipt of a token, a value of current priority level in said token; and comparing the read value of priority level in said token with the highest value of priority levels stored in said storing means and upon coincidence, resetting to the other state a value at a bit position of said storing means corresponding to at least said highest value.

2. A priority level storing method according to claim 1 wherein said storage means is register means including the same number of flip-flops as that of grades of the priority level.

3. A priority level storing method according to claim 1 wherein the values of priority levels are encoded so that the token and frame contain coded values, the value of reservation level to be stored is decoded and thereafter supplied to said storing means in the step of storing said value, and in the step of resetting the bit position of said storing means, said highest value of priority levels stored in said storing means is encoded and thereafter compared with the value of priority level read out of said token.

4. A priority level storing method according to claim 1 wherein the value of priority levels contained in the token and frame is constituted by a plurality of bits which are identical in number to grades of the priority level with bit positions respectively corresponding to values of the priority level.

5. An apparatus for storing priority levels in a token-ring network system having a ring transmission link and a plurality of nodes accommodated in the ring transmission link, each node being capable of transmitting/receiving a token and a frame, wherein each node can reserve in a frame being passed through said transmission link a priority level for a frame that the node of its own requests for transmission and can transmit the frame of its own requested for transmission when acquiring a right to transmission by receiving a token, said apparatus included in each node comprising:

first and second register means for temporarily storing values of current and reservation priority levels, respectively;

storage means having the same number of bits as that of grades of the priority level with bit positions respectively corresponding to values of the priority level;

means connected to said storage means, for detecting the highest value and the secondly high value of priority levels stored in said storage means;

third and fourth register means connected to said detecting means, for temporarily storing the detected highest value and secondly high value of priority levels, respectively; and control means connected to said first, second, third and fourth register means as well as to said storage means, for selectively supplying values of priority levels stored in said register means to said storage means and changing values at bit positions of said storage means corresponding to the selected values of priority levels.

6. A priority level storing apparatus according to claim 5 wherein said control means includes:

first comparator means connected to said first and third register means, for comparing the values of priority levels of both the register means;

second comparator means connected to said first and second register means, for comparing the values of priority levels of both the register means;

third comparator means connected to said second and fourth register means, for comparing the values of priority levels of both the register means;

a selector circuit connected to said first to fourth register means, for selecting one of the values of priority levels of said register means and supplying the selected one value to said storage means; and a priority level judging circuit connected to said comparator means, selector circuit and storage means and being responsive to comparison results from said comparator means, for controlling said selector circuit and storage means so as to change a value at a bit position of said storage means corresponding to said selected one value of priority level.

7. A priority level storing apparatus according to claim 5 wherein said first to fourth register means temporarily store encoded values of priority levels, decoder means is interposed between said control means and said storage means, and first and second encoder means are interposed between said detecting means and said third and fourth register means, respectively.

8. A priority level storing apparatus according to claim 5 wherein said storage means includes:

the same number of RS flip-flops as that of grades of the priority level; and gate means connected to R and S input terminals of each flip-flop, for selectively setting or resetting a flip-flop corresponding to said selected one value of priority level.

9. A priority level storing apparatus according to claim 5 wherein said detecting means includes:

a first priority encoder connected to said storage means, for preparing the highest value of priority levels from the values stored in said storage means;

means connected to said first priority encoder and said storage means, for eliminating from the values stored in said storage means a value at a bit position corresponding to said highest value of priority level; and a second priority encoder connected to said gate means, for preparing the secondly high value of priority level.

* * * * *